United States Patent

[11] 3,576,427

[72] Inventor Bernard M. Taylor, Jr.
1043 W. 35th St., Los Angeles, Calif. 90007

[21] Appl. No. 610,301
[22] Filed Jan. 19, 1967
[45] Patented Apr. 27, 1971

[54] PERSPECTIVE OR ORTHOGRAPHIC PLOTTER
4 Claims, 8 Drawing Figs.

[52] U.S. Cl. .......... 235/61.6, 33/1, 235/151, 340/172.5
[51] Int. Cl. .......... G06f 3/00, G06k 15/00
[50] Field of Search .......... 235/61.6 (A), 61.11, 61.111, 184; 338/167, 170, 89; 33/1 (M), (x-y); 340/172.5 (Inquired); 346/29; 235/151 (Inquired)

[56] References Cited

UNITED STATES PATENTS

| | | | |
|---|---|---|---|
| 2,617,587 | 11/1952 | Carpenter | 33/1-(M)UX |
| 3,422,537 | 1/1969 | Dewey et al. | 33/1(M)X |
| 2,796,501 | 6/1957 | Daily | 338/170 |
| 2,992,387 | 7/1961 | Austin | 235/61.6(A) |
| 3,145,474 | 8/1964 | Taylor | 235/151X |

*Primary Examiner*—Maynard R. Wilbur
*Assistant Examiner*—Thomas J. Sloyan
*Attorney*—Keith D. Beecher

ABSTRACT: This invention relates to analog computing systems and apparatus for producing selected two-dimensional perspective or orthographic projections; and it relates more particularly to an improved analog computing system and apparatus for plotting such projections automatically in response to an input record.

[signature] INVENTOR

INVENTOR

KEITH D. BEECHER
ATTORNEY

PERSPECTIVE OR ORTHOGRAPHIC PLOTTER

BACKGROUND OF INVENTION

Rather than responding to the 3-space coordinates of a multiplicity of arbitrarily selected, points to provide two-dimensional projections, as is taught in U.S. Pat. No. 3,153,224, which issued Oct. 13, 1964 in the name of the present inventor; the record presented to the apparatus and system of the present invention includes three continuous curved contour lines representative of the 3-space parameters of the subject matter to be plotted. The apparatus and system of the invention responds to the continuous lines on the input record, on an analog basis, to plot contour lines on a two-dimensional plane representative of a selected three-dimensional perspective or orthographic projection of the subject matter.

SUMMARY OF THE INVENTION

As an improvement over the digital-type of system, such as described in the patent referred to above, the record of the three-dimensional subject matter which is fed into the apparatus and system of the present invention is capable of accommodating material representing a subject of any volume, up to a subject occupying all of space or possessing infinite volume, with respect to the selected position of the imaginary observer in space; and the apparatus and system of the invention is capable of plotting the perspective or orthographic projections of that subject, as seen from the selected vantage point of the imaginary observer.

Moreover, the system and apparatus of the invention is capable of plotting the selected projections of two or more infinitely separated objects, without changing the position in space of the imaginary observer.

An object of the invention is to provide an improved system and apparatus which is capable of automatically drawing the perspective or orthographic projections of 3-space curved lines, or contours, in limitless space; and without operator intervention; and as seen from any selected imaginary observer's position, likewise in limitless space.

Stated differently, an object of the invention is to provide an improved automatic perspective or orthographic analog plotting system and apparatus which is capable of automatically plotting orthographic or perspective pictorial projections of three-dimensional subjects, as viewed from any selected vantage point.

The subject to be plotted is presented to the system and apparatus of the invention as a continuous record bearing three-dimensional information in the form of a plurality of distinct substantially continuous lines. The apparatus responds to the three or several lines of the record to produce any arbitrarily selected perspective or orthographic projection drawing of the subject represented thereby.

The system and apparatus of the present invention is also capable of automatically plotting, for example, as dashed lines, certain lines which would be normally hidden. These dashed lines are presented for any portion of a line which is hidden from view of the imaginary observer at any particular selected position of the observer, in the case of perspective projections; or for a particular picture plane in the case of orthographic projections.

An advantage of the apparatus of the invention is that it is relatively simple and inexpensive to construct. As mentioned above, the apparatus is of the analog-type, as distinguished from the digital machine described in the aforementioned patent. As also pointed out, the system and apparatus of the present invention is advantageous, as compared with the digital-type of machine, in that it responds to analog inputs directly, and produces analog outputs directly, so that there is no need for extraneous analog-digital or digital-analog equipment.

In addition, the improved apparatus and system of the invention, as distinguished from the digital-type of machine, does not lose precision due to initial analog-digital conversions, and final digital-analog conversions, which are necessary in the digital machine. Such conversions, for example, instead of producing true curved lines in the two-dimensional output display, yield digitally stepped sawtooth lines, or other approximations.

It is further notable that the system vis a vis other analog designs represents a diligent effort to optimize the algebraic transfer functions employed in the design of the system in terms of practical components actually available, and thereby to reduce to the practical minimum not only the cost of the hardward design, but also to reduce to the practical minimum the number of components in the system block logic and correspondingly reduce the total random noise in the output of the overall apparatus, to yield precision and smoothness with freedom from irrelevant deviations from the correct curvilinear projections in the final drawings, as otherwise indicated by roughness in the output line.

Further advantages of the improved analog-type apparatus and system of the invention, as compared with the digital-type of machine, are that it is less complicated and less expensive in its construction, and in that it can be operated more simply and at a theoretically substantially higher speed.

DESCRIPTION OF A PRESENTLY PREFERRED EMBODIMENT

Figures 1A, 1B, 1C, 1D:
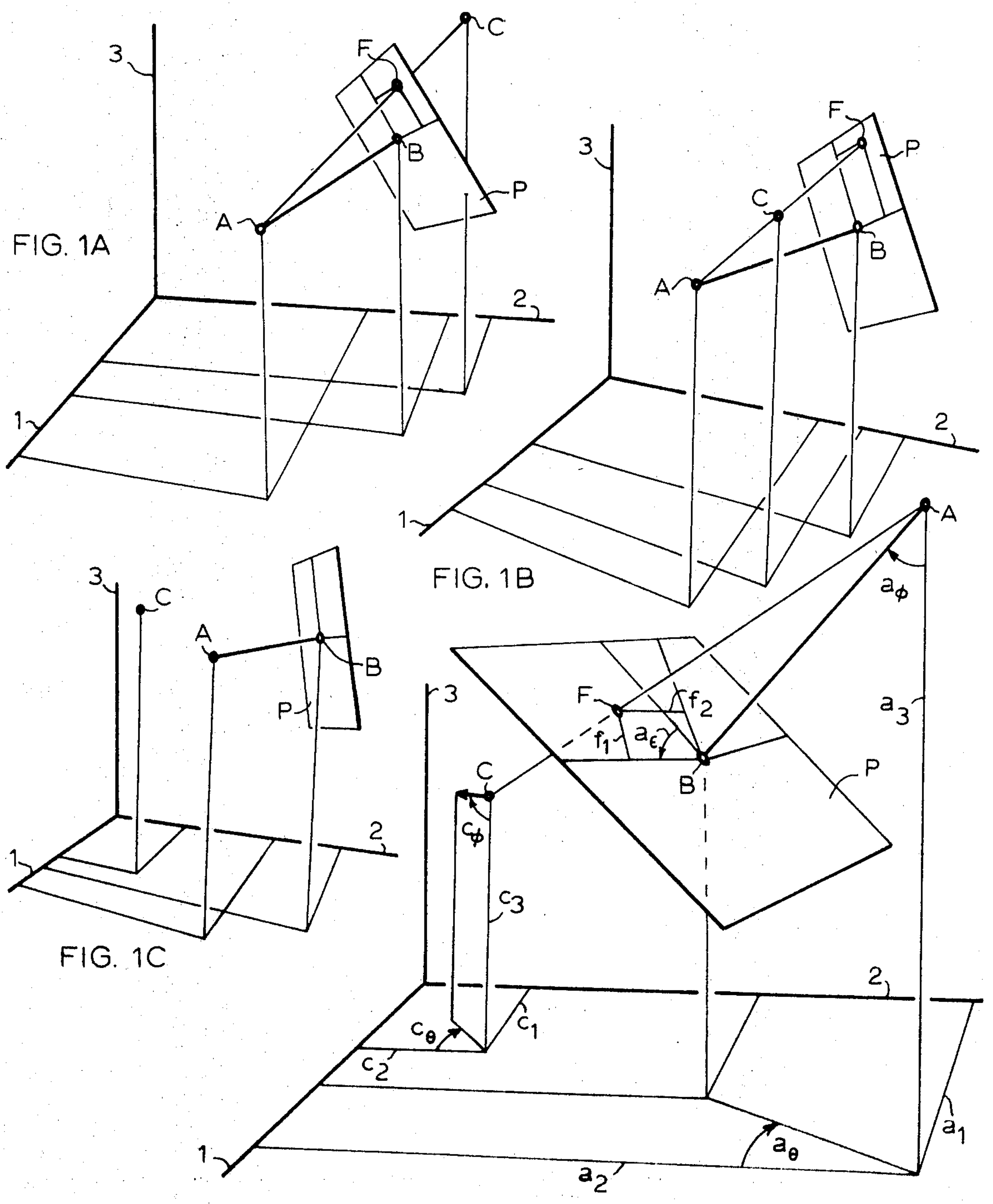
FIGS. 1A—1D are diagrams representing the geometric capabilities of the system of the invention for perspective projections.

The general geometry of perspective projection for the purpose of the present invention is shown in FIG. 1D. In FIG. 1D, the observer position A is specified by three position coordinates $a_1$, $a_2$ and $a_3$, these being taken with respect to three arbitrary rectangular coordinate axes 1, 2 and 3. Also shown in FIG. 1D is a picture plane P, which is considered to be a distance of unity away from the observer position, and represents the plane into which a plurality of points, such as the point C, and having position coordinates $c_1$, $c_2$ and $c_3$ with respect to the aforesaid axes 1, 2 and 3, are to be projected as a perspective projection. F is the central projection of the point C in the selected picture plane P, colinear with the points A and C. The projections F is measured on the planar coordinate system in the picture plane, whose origin is a point B, which is the nearest point in the plane to the observer A, and which yields the planar coordinates $f_1$ and $f_2$.

The coordinate system of which B is the origin is designated a planar coordinate system, since it exists only in the plane C, and is two-dimensional. The coordinate system represented by the three axes 1, 2 and 3, is a three-dimensional coordinate system.

The observer A is free to wander throughout all space, and he may further adopt any attitude in that space relative to the projected three-dimensional material, as illustrated in FIGS. 1A—1D. The observed position A in FIG. 1D may be specified by the three positional coordinates $a_1$, $a_2$ and $a_3$, as mentioned above, and by observer orientation parameters $\underline{a_\phi, a_\theta, a_\epsilon}$.

The observer may assume any position throughout all of space, and may further adopt any attitude in that space relative to the projected three-dimensional material, as shown, for example, in FIGS. 1A, 1B and 1C.

In FIG. 1A, for example, there is illustrated the observer A, and the nearest point B in the picture plane C, a three-space point C beyond the picture plane and being momentarily projected as point F in the picture plane colinear with A and C, all with reference to the arbitrary rectangular coordinate axes 1, 2 and 3.

In FIG. 1B, the point C being momentarily projected into the picture plane assumes a position between the observer A and the picture plane. FIG. 1C, however, represents the case of a point C which falls behind the observer with respect to the picture plane, and which therefore cannot be projected in perspective.

The surface orientation angles and $c_\theta$ are also shown in FIG. 1D. These angles represent the pitch and bearing orientation of the normal to the tangent plane of the object surface being projected as the momentarily projected point C, as well as this projected point's coordinates $c_1$, $c_2$ and $c_3$.

Figures 2A, 2B, 2C:
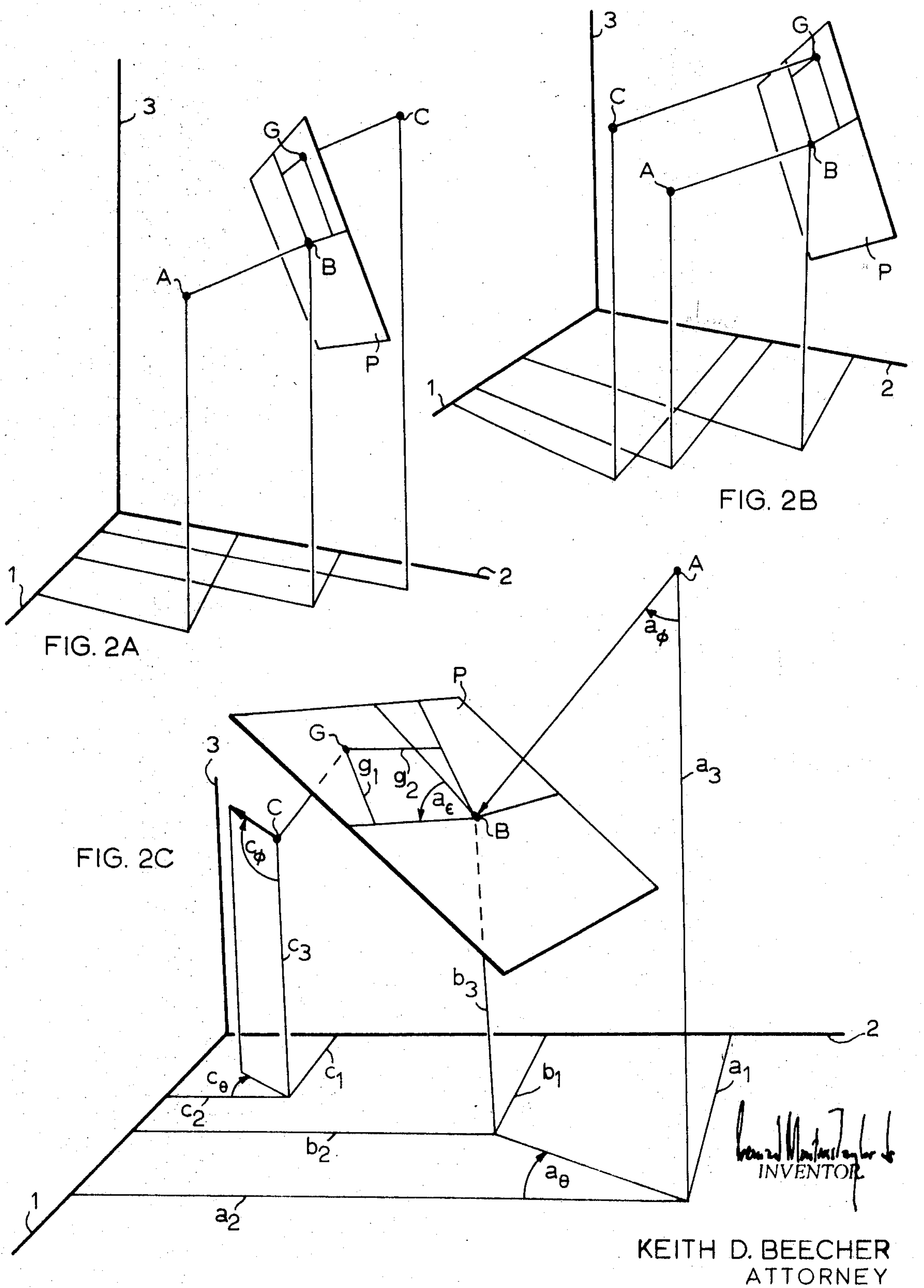
FIG. 2A—2C are further diagrams representing the geometric capabilities of the system for orthographic projections.

FIGS. 2A, 2B and 2C illustrate three different examples of orthographic projection. FIGS. 2A, for example, illustrates the observer A, the picture plane P, the nearest point in the picture plane B, and the orthographically projectable point C, which yields the projected point G in the picture plane.

The point C lies behind the picture plane in the representation of FIG. 2A, and it lies in front of the picture plane and behind the observer in FIG. 2B.

Points which fall behind the observer may nevertheless be projected into the picture plane for orthographic projections, even though these points have no perspective projections. The general case of orthographic projection, is shown in FIG. 2C.

Figure 3:
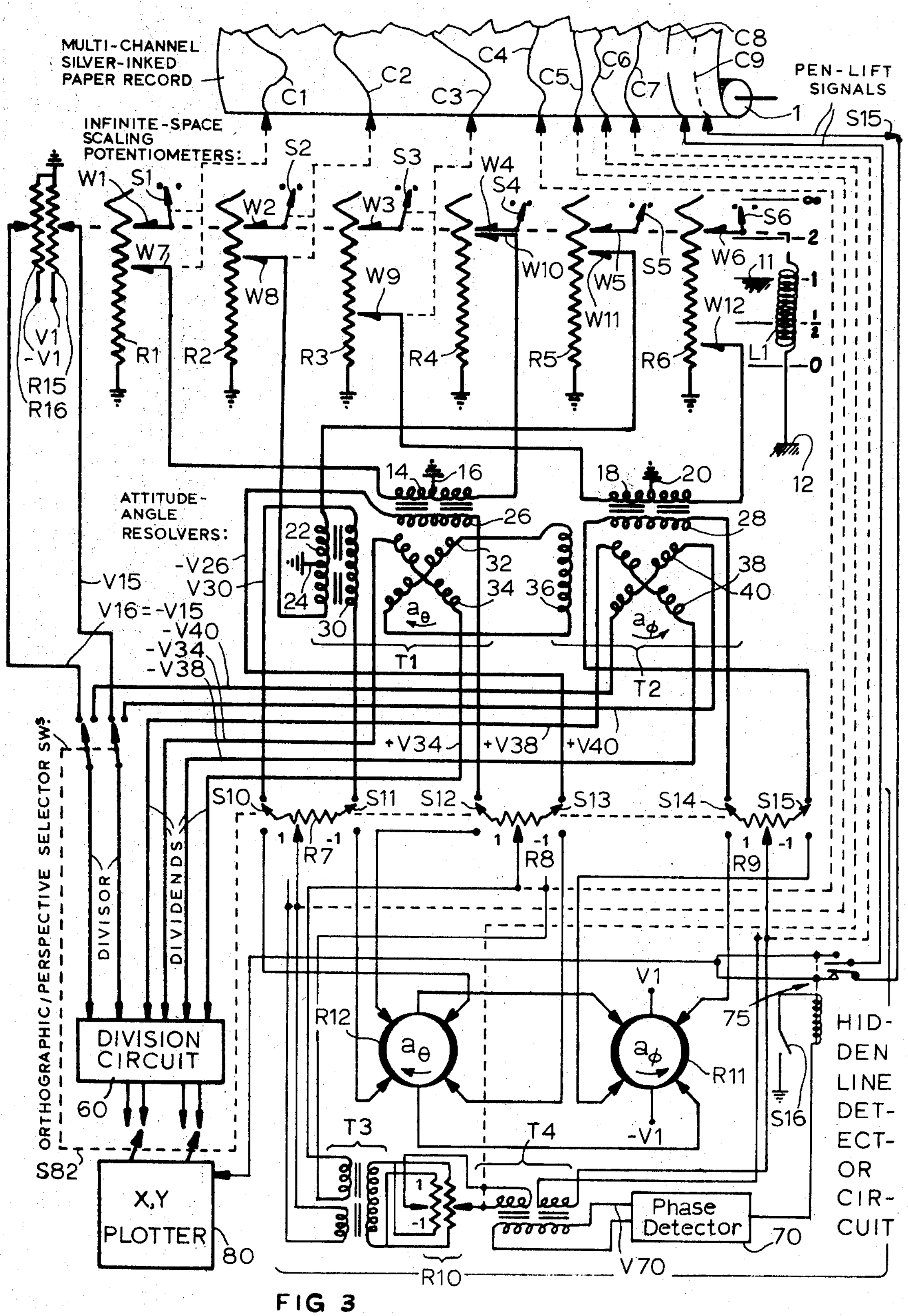
FIG. 3 is a schematic diagram of the system of the invention, and of the electric circuitry involved therein, in accordance with one embodiment of the invention.

As mentioned above, FIG. 3 illustrates the components and circuitry which make up the system of the present invention. The input unit for the system of FIG. 3 is designated as 1, and this unit comprises a multichannel conductive-inked strip chart record. The inputs to the system are recorded as continuous lines on the strip recorder 1. The input parameters, as indicated by the lines $c_1$, $c_2$ and $c_3$, represent the coordinates $c_1$, $c_2$ and $c_3$. The input parameters are designated by the continuous lines $c_4$, $c_5$, $c_6$ and $c_7$, respectively represent the quantities sin $c_\phi$, cos $c_\phi$, sin $c_\theta$ and cos $c_\theta$. These lines are tracked by usual electromechanical means to provide a linear servo-type drive for corresponding potentiometers R1, R2, R3, R7, R8, R9, R10, this being achieved by usual servo drive mechanisms of any appropriate type (not shown).

Specifically, as the strip recorder 1 moves the silver-inked paper record, the various brushed associated with the conductive lines on the record are caused to track the corresponding lines. This tracking, for example, may be carried out by appropriate servomechanisms which respond to differences in resistance whenever a brush tends to leave the line so as to maintain the brush alignment with its particular conductive line. The resulting movement of each brush causes its associated servomechanism to produce a corresponding movement to the wipers associated with the potentiometers R1, R2, R3, R7, R8, R9 and R10. Appropriate servo controlled mechanisms for this purpose are described, for example, in U.S. Pat. Nos. 2,838,683; 3,112,360; and 3,381,086.

Further, these lines may be initially recorded in any one of several manners, including: (1) by the draftsman; (2) as direct analog or digital computer output records; or (3) as a pencil transmitter/coordinatograph recording. Using the machine of U.S. Pat. No. 3,145,474, as embodied, for example, in the Illustromat 1100 of Perspective, Inc., 3600 Wilshire Boulevard, Los Angeles, Cal., and modified appropriately, the desired recording and one ordinary pictorial view might be expediently drawn together, with economical results. Objects to be represented are indicated by the coordinate $c_1$, $c_2$ and $c_3$, and the lines C1, C2 and C3 merely represent the various coordinate values given to the draftsman from which he draws the line C1, C2 and C3, whereas the values sin $c_\phi$, cos $c_\phi$, sin $c_\theta$ and cos $c_\theta$ are also given to the draftsman so that he can draw the lines C4, C5, C6 and C7.

Unlike the tracked continuous variables mentioned in the preceding paragraphs, two pen-lift discrete lines C8 and C9 on the recorder 1 supply electrical signals to the system which are indicative of the position of the ends of projected lines in the pictorial drawing. That is, these latter lines indicate the 3-space positions where the pen is to ink or to lift from the 2-space projection of the output plotter 80, for ordinary lines in the case of C8, and hidden lines in the case of C9 signals, respectively.

The potentiometers R1—R6 each have a nonlinear portion and a linear portion. These potentiometers combine to provide an automatic infinite space scaler and linearizer. Each of the potentiometers R1—R6 is wound linearly from the lower end, which is grounded, up to the midpoint of the potentiometers. Then, each potentiometer is wound reciprocally to a theoretical infinite resistance point at the upper end. The winding is "continuous" if an added restriction is imposed that the lower half of the reciprocally wound portion of the potentiometer, which is to say the section from the point halfway up to the three-quarters point, must have a total resistance equal to the resistance of the lower and linear portion; in theory, however, such a restriction is not required if the boundary point is tapped, with this tap supplied a proportional voltage based on the operation of another linear potentiometer (e.g., R15) in the gang.

The potentiometers R1—R6 have respective wipers W1—W6 which are mechanically coupled to one another. These wipers are spring biased by a spring L1. The wipers W1—W6 all assume a position which is determined by the engagement of one such wipers with particular one of a second group of wipers W7—W12 which is set to the uppermost position, or by a mechanical stop at center 11. The wipers W7, W8 and W9 are controlled by the corresponding lines $c_1$, $c_2$ and $c_3$ on the input record 1, by appropriate servomechanisms, not shown, to assume positions corresponding to the coordinates $c_1$, $c_2$ and $c_3$. The wipers W10, W11 and W12, on the other hand, are manually set to insert the selected observer coordinates $a_1$, $a_2$ and $a_3$.

In the illustrated example of FIG. 3, the position of all the wipers W1—W6 under the spring bias of the spring L1 is established by the wiper W4, since it bears against the wiper W10; the latter having been set to a maximum position, as compared with center stop 11 and wipers W7, W8, W9, W11 and W12.

The wipers W1—W6 supply a unit alternating current voltage (V1 or −V1) to the respective potentiometers R1—R6. The phase (sign) of the voltage V1 is independently determined for each potentiometer by the setting of respective switches S1—S6. The absolute magnitude of the largest of the six outputs will be unity; and the remaining outputs will be proportional, and will bear the correct signs.

The first three potentiometers R1, R2 and R3 are set by the input parameters $c_1$, $c_2$ and $c_3$, all of which have finite positions as represented by the corresponding continuous lines on the recorder 1. These lines are representative of parameter values from minus infinity to plus infinity for the object in three-dimensional space. This representation is in accordance with the scale shown to the right of the potentiometer R1 in FIG. 3, and according to the proper sign.

The potentiometers R7—R10 are set respectively by the input parameters cos $c_\theta$, sin $c_\phi$, cos $c_\phi$, sin $c_\theta$, as represented by the lines $c_4$—$c_7$ on the input record. These are used for hidden line representations.

The sign position of the switches S1—S3 is mechanically switched by the motion of the tracking mechanism of the recorder 1, and the potentiometer motion is reversed by reversing their corresponding servomechanisms (in known manner) as the variable passes through zero. The second three potentiometers R4, R5 and R6 are observer position potentiometers, and they are manually set in accordance with the selected parameters $a_1$, $a_2$ and $a_3$.

The mathematics of the automatic scaling network is as follows:

$$-1 \leq t \leq 1$$

$$-1 \leq s \leq 1$$

and moreover, $s=f(a)$ or $f(c)$, meaning the true geometric variables, as follows:

$$a=2s, -1<a<1$$

$$a=\frac{1}{2(1-s)}, 1<a<\infty$$

$$a=\frac{1}{2(1+s)}, -\infty<a<-1$$

$$\left.\begin{aligned}|a|_{max.}&=\frac{1}{2(1-|s|_{max.})}\\ t&=\frac{a}{|a|_{max.}}\end{aligned}\right\}|s|_{max.}>\frac{1}{2}$$

where: $t$ is the signal output from the circuit; and $s$ is the linearly tracked variable;

and the $s$ and $t$ relations are:

$$t=\frac{1-s_{max.}}{1-|s|},-1<s<-\frac{1}{2}$$

$$t=\frac{1-s_{max.}}{1-s},\frac{1}{2}<s<1$$

$$t=4s(1-s_{max.}),-\frac{1}{2}<s<\frac{1}{2}$$

It is to be noted that $|s|$ must always equal or exceed one-half, due to the mechanical spring stop 11, shown in FIG. 3.

At any particular moment, the space linearizer's outputs, which is to say the voltages on the wipers W7, W8, W9, W10, W11 and W12, are directly proportional to their true geometric counterparts $c_1$, $c_2$, $c_3$, $a_1$, $a_2$ and $a_3$ respectively; no matter how large these geometric counterparts may be. At any particular moment also, the space linearizer's outputs fully exploit the range of the circuit's power inputs.

If, however, the mechanics of the potentiometer assembly is considered too costly for simple construction, the circuit may be suitably modified such that the upper gang of wipers is in effect are lowered to the center stops, the upper windings of the potentiometers R1—R6 are eliminated, and the reference voltage (both positive and negative) is substituted for the potentiometers R14—R16. Infinite space capabilities of the system are in this way simply removed, and the device's other capabilities remain undisturbed.

The observer's attitude includes the three angles $a_\theta$, $a_\phi$ and $a_\epsilon$, which respectively represent Eulerian heading, pitch and roll.

In the system of FIG. 3, however, only the observer heading and the observer pitch are electromechanically provided as parameters. The observer roll may be changed from the zero value, established in the system of FIG. 3, by simply rotating the two voltages or the sheet in the plotter 80 on which the selected projection is plotted and in a customary manner.

The angular selectors for $a_\theta$ and $a_\phi$ are 4-coil inductance resolvers T1 and T2. A third 4-coil resolver may easily be added to take care of the parameter $a_\epsilon$, but for ordinary purposes, and as indicated above, such an addition is not required.

The inductor systems 14, 18 and 22 are subtracting transformers. Thus, the subtractions $a_1$—$c_1$, $a_2$—$c_2$ and $a_3$—$c_3$ are performed by the respective inductor systems. The outputs from the subtracting transformers are the voltages derived across the rotating coils 34, 38 and 40. These coils yield signals which are momentarily proportional to the quantities:

$$g_1=(a_1-c_1)\cos a_\theta-(a_2-e_2)\sin a_\theta$$

$$g_2=(a_1-c_1)\sin a_\theta\cos a_\phi+(a_1-c_2)\cos a_\theta\cos a_\phi-(a_3-c_3)\sin a_\phi$$

$$\lambda=(a_1-c_1)\sin a_\theta\sin a_\phi+(a_2-c_2)\cos a_\theta\sin a_\phi+(a_3-c_3)\cos a_\phi$$

The quantities are directed to the division circuit 60 which simply calculates the following:

$$f_1=\frac{V_{34}}{V_{40}},\qquad V_{40}>0$$

$$f_2=\frac{V_{38}}{V_{40}},\qquad V_{40}>0$$

$$|f_1|=\infty,\qquad V_{40}<0$$

$$|f_2|=\infty,\qquad V_{40}<0$$

The division circuit 60 may be similar to the division circuit described in detail in U.S. Pat. No. 3,145,474 which issued Aug. 25, 1964 in the name of the present inventor. If the circuit described in the patent is used directly, synchronous rectification may be employed immediately in advance of the division process.

Whenever orthographic projections are selected, the quantity V15 derived from the potentiometer R15 must be used as a proportional divisor, in lieu of λ. The substitution is a simple switching arrangement, to compensate for momentary changes in the reciprocally wound potentiometers, yielding, for the orthographic case:

$$g_1=\frac{V34}{V15}$$

$$g_2=\frac{V38}{V15}$$

The switching means is combined with other switches in the system S82 of FIG. 3, in which either V15 or V38 is employed for the divisor voltage.

The output may be further scaled, as required. Continuous variations in the automatic scaling circuit have no detrimental effect in the perspective case. The reason for this is that the dividend and divisor are, at any instant in time, equally scaled, and the resulting division yields a quotient which cannot be altered by these scaling changes.

The X,Y plotter 80 plots the result of the projection, either orthographic or perspective. The switch S82 is used to select either the orthographic or perspective outputs from the division circuit 60.

Orthographic drawings should be set up on the basis of the maximum anticipated coverage of input spaces required. In orthographic drawing, observer recession beyond the linear zone increases the scope and diminishes the scale of the work, where no true observer in the sense of central projection exists; in the terminal case, all of the infinite space is reduced to a relatively meaningless axonometric drawing.

A special control circuit is required for differentiating between the hidden and visible lines in the output. The phase detector 70 applies a signal whenever the point C, being momentarily projected, is accompanied by surface parameters which show that the particular surface is directed away from the observer. The detector may contain a hysteretic control for stability in drawing true pictorial margins, and an off center null may be employed for reliable margin formation in all drawings.

The signal from the phase detector 70 actuates the single-pole double-throw relay 75. The relay 75 includes a normally closed contact through which the pen-lift signal C8 is applied to the X, Y plotter 80, and the relay also includes a normally open contact through which the pen-lift signal C9 is applied to the plotter. The relay 75, therefore, selects between the hidden line and visible line pen-operating signals C8 and C9.

Inasmuch as the criteria differ for the perspective and the orthographic projections as to whether the surface is so oriented, special switches are supplied to cause either the perspective or orthographic criterion to operate. The algebra for hidden line recognition is such that the alterations to the circuit that are absolutely necessary may be accomplished by utilizing merely the six switches S10—S15. The switches are shown in FIG. 3 in their perspective position. They are of course ganged together with switch S82, by means of which perspective or orthographic projection is selected.

The algebraic condition that a perspective line be hidden by the line's own surface orientation is:

$$[(a_1-c_1)\sin c_\theta+(a_2-c_2)\cos c_\theta]\sin c_\phi-(a_3-c_3)\cos c_\phi>0$$

For hidden line determination the observer position is relevant in perspective and irrelevant in orthographic projection. The algebraic condition for the orthographic hidden line may be expressed by:

$$[-\sin a_\theta\sin a_\theta\sin c_\theta-\sin a_\phi\cos a_\theta\cos c_\theta]\sin c_\phi-\cos a_\phi\cos c_\phi>0$$

In the circuit of FIG. FIG. 3, the two sine-cosine potentiometers R11 and R12 are coupled to the corresponding resolving transformer systems T1 and T2 for observer orientation angles $a_\theta$ and $a_\phi$. These potentiometers are used only in the case of orthographic projections. For perspective hidden line recognition, the voltages $a_1$—$c_1$, $a_2$—$c_2$ and $a_3$—$c_3$ are obtained through the use of coils 26, 28 and 30, respectively.

The transformer system T3 is used for summing, and the transformer system T4 is used for subtracting two variables. In the final result, when the signal V70 is positive, the perspective or orthographic line is visible. When the potential V70 is negative, the line is an invisible line, and the section relay 75 operates to cause a dashed line to be projected in the final drawing on the X, Y plotter 80, such dashed line appearing according to the plan specified by the input tape, that is, with the dashes and skips to occur as a specified by the artist or system or other original creator of the tape, but in a reliable manner.

The variable resistances R7, R8, R9 and R10 are resistance pairs, that is, are comprised of two potentiometers of opposite polarity, shown clearly only for R10 in the drawing of FIG. 3.

Different modes of drawing hidden lines in the final output projection are provided. For example, opening switch S15 while the switch S16 remains closed prevents the appearance of the hidden line and enforces the disappearance of away-turning surfaces' projections. On the other hand, opening switch S16 prevents all of the operations of the hidden line detector circuit from having effect. In the latter case, the would-be hidden line is plotted as a continuous line just like any other line in the drawing, but without interference with the normal end-of-line segment pen-lift operations. A still further possiblity is that of providing plotter pens of different widths, a wide line being drawn for visible lines, a fine, narrow line being drawn for hidden lines, in order to yield maximally informative output drawings, but again under the control of the relay 75.

The hidden line evaluating part of the system is subject to various economies in its design and construction. Thus, for example, instead of supplying the four variables sin $c_\phi$, cos $c_\phi$, cos $c_\theta$, the strip recording chart may be made to supply only three, namely, sin $c_\phi$, sin $c_\theta$, sin $c_\phi$ cos $c_\theta$, and cos $c_\phi$. These are direction cosines and, as such, lend themselves to an easy adaptation to the design of the circuit as shown in the following discussion, based upon the hidden line system described in this specification. Furthermore, only two variables need at a minimum be supplied; these are the Euler angles by themselves, $c_\theta$ and $c_\phi$.

One version of the circuit may be based upon the replacement of the sine cosine potentiometer by two 4-coil resolvers so as to yield the corresponding vector components for the observer, to wit, cos $a_\phi$, sin $a_\phi$ cos $a_\theta$, sin $a_\phi$ sin $a_\theta$, which are obtained by introducing a unity field voltage to the pair of resolvers; and the servo motors which track the input chart recording may as well be made to operate multiplier wipers in the three multiplying potentiometers whose multiplicand voltages would be in perspective. Furthermore, the available voltages, already shown in the drawings as the variables $a_1$—$c_1$, $a_2$—$c_2$, $a_3$—$cah3$, are the outputs from the two resolvers referred to above, namely, —sin $a_\phi$ sin $a_\theta$, —sin $a_\phi$ cos $a_\theta$, and cos $a_\phi$, respectively, according to whether perspective or orthographic is selected.

In connection with possible modes of preparation of the input three-dimensional records; the hidden line parameters $c$ and $c_\theta$; or sin $c_\phi$, cos $c_\theta$, sin $c_\theta$, and cos $c_\phi$, or direction cosines sin $c_\phi$ sin $c_\theta$, sin $c_\phi$ cos $c_\theta$, and cos $c_\phi$; may be input to the recording, during its preparation, by means of two additional resolvers (or potentiometers) attached to easily operated tracing markers which point out under operator control the necessary orientation angles for the surface, at the point where it is momentarily being drawn. Such markers or pointers could be made, for example, in the form of rotatable knob (as pitch indicator) and rotatable shoe (as yaw pointer) at the tracing point provided. Other possibilities will present themselves to those who fabricate the necessary apparatus.

The system is clearly subject to certain modifications and economies in its design. For instance, the infinity scaling parts of the circuit may be completely eliminated, causing the machine to more closely resemble the machine of the previous patent preferred to previously in the specification.

The division circuit may be left out for use in axonometric projection only, causing a great reduction in cost of the electronic circuitry involved, if not of mechanical and structural portions of the machinery. These may all be simplified, in turn, to the isometric projections, and simplification to a select group of isometric, dimetric, and trimetric projection cases is also possible.

The system may be made available for purchase in successive units, according to a customer's varied requirements. Different combinations and permutations of equipment components may be supplied according to need, or to budgetary considerations.

Let us suppose, for instance, that infinity scaling is limited, in a particular combination, to permit only the observer to roam throughout infinite space, and the three-dimensional drawing input is always entirely linear. The benefit of this choice might be considered to be some particular cost reduction in the exponential potentiometers. Another possible benefit is the removal of a need to train personnel to work with non-linear records of large regions of the drawing space.

The customer may be interested, for example, in making a master perspective view, utilizing several linear three-dimensional input drawings of varying scales and presentations relative to the master drawing. One of these might have a great different scale, as in the case of a planetarium model of moon, stars, sun and planets; or in the case of a greatly enlarged detail drawing. The various detail spaces may vary widely in character.

Nonetheless, the customer has the necessary resources available to him for his work's implementation. It is noteworthy that the observer still may be unreservedly removed to arbitrary new positions and attitudes relative to any of the inputs. With a group of varying input drawings containing different parts of the master material presented, the corresponding observer positions and attitudes may be chosen with the purpose in mind of causing the various input spaces to become homothetic and congruent, through a simple recognition of corresponding points in the detail space relative to the master space. In this manner, using for example a reasonable hand calculation for determining the particular observer vector components to be used for each input space after the first, all of the output drawings will in fact become congruent at the output plotter.

It will be appreciated, therefore, that the improved system and apparatus of the present invention responds in an analog manner to the continuous record obtained from the recorder 11, so as to project either orthographic or perspective representations of the object represented by the record, these projections being adjusted for any selected position of the observer in space, and for any selected attitude of the observer.

The apparatus and system of the invention is eminently simple to construct and operate, and eminently suitable for obtaining its desired result.

While a particular embodiment of the invention has been described, modifications may be made. It is intended to cover in the claims, all modifications which come within the scope of the invention.

I claim:

1. A system for providing two-dimensional projections in a selected picture plane of a subject specified by three-dimensional space lines, including: an input record bearing three-space information concerning coordinates of different points of the subject with respect to a selected three-dimensional coordinate system in the form of a plurality of distinct continuous lines; first control means including respective wiper means for tracking the aforesaid lines and further including respective first potentiometer means mechanically coupled to said respective wiper means for producing distinct analog signals representative of the contour of each of the aforesaid lines; second control means including manually adjustable second potentiometer means for producing analog signals representative of the coordinates of a selected position of said observer with respect to said three-dimensional coordinate system; third control means including inductive resolver means manually adjustable to produce analog signals representative of the attitude of the observer with respect to the aforesaid subject; and processing means coupled to said first and second and third control means and responsive to the analog signals produced thereby for developing output signals representative of a selected two-dimensional projection of the aforesaid subject in said picture plane.

2. The system defined in claim 1, and which includes in said processing means switching circuitry for selectively causing the output signals therefrom to represent orthographic or perspective projections.

3. The system defined in claim 1, in which said processing means further includes circuitry for producing distinguishing signals for the projection of normally hidden lines of the aforesaid subject.

4. The system defined in claim 1, in which said input record includes three contour lines representative of three-dimensional position coordinates of the subject with respect to the aforesaid three-dimensional coordinate system and four further lines representative of the sines and cosines of two orientation angles of the subject, and by said first control means including further wiper means for respectively tracking the aforesaid four further lines on said input record and further respective potentiometer means for producing further analog signals representative of the contours of said further lines, and by said processing means including discrete detector means for modifying the aforesaid output signals in accordance with said further analog signals.